US012786070B2

(12) United States Patent
Ezrielev et al.

(10) Patent No.: US 12,786,070 B2
(45) Date of Patent: Nov. 3, 2026

(54) SYSTEM AND METHOD FOR EXECUTING MULTIPLE INFERENCE MODELS USING INFERENCE MODEL PRIORITIZATION

(71) Applicant: Dell Products L.P., Round Rock, TX (US)

(72) Inventors: Ofir Ezrielev, Beer Sheva (IL); Jehuda Shemer, Kfar Saba (IL); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 924 days.

(21) Appl. No.: 18/060,130

(22) Filed: Nov. 30, 2022

(65) Prior Publication Data

US 2024/0177028 A1 May 30, 2024

(51) Int. Cl.
*H04L 41/14* (2022.01)
*G06F 9/50* (2006.01)

(52) U.S. Cl.
CPC .......... *H04L 41/145* (2013.01); *G06F 9/5044* (2013.01); *G06F 9/5088* (2013.01); *G06F 2209/501* (2013.01)

(58) Field of Classification Search
None
See application file for complete search history.

(56) References Cited

U.S. PATENT DOCUMENTS 7,593,729 B2 9/2009 Barak
10,142,174 B2 11/2018 Yang et al.
10,341,354 B2 7/2019 Murugesan et al.
10,853,129 B1 * 12/2020 Sengupta ............... G06N 3/105
11,216,482 B2 1/2022 Khillar et al.
11,886,960 B2 1/2024 Kaufmann
2008/0256167 A1 * 10/2008 Branson ................ G06F 11/203
709/201

(Continued)

OTHER PUBLICATIONS

Abadi, Martin et al. "TensorFlow: Large-Scale Machine Learning on Heterogeneous Distributed Systems." Google Research. Mar. 16, 2016, pp. 1-19 (Year: 2016).*

(Continued)

*Primary Examiner* — Lewis A Bullock, Jr.
(74) *Attorney, Agent, or Firm* — WOMBLE BOND DICKINSON (US) LLP

(57) ABSTRACT

Methods and systems for managing execution of inference models across multiple data processing systems are disclosed. To manage execution of inference models across multiple data processing systems, a system may include an inference model manager and any number of data processing systems. The inference model manager may obtain operational capability data for the inference models from the data processing systems. The inference model manager may use the operational capability data to determine whether the data processing systems have access to sufficient computing resources to complete timely execution of the inference models. If the data processing systems do not have access to sufficient computing resources to complete timely execution of the inference models, the inference model manager may re-assign one or more data processing systems to re-balance the computing resource load and support continued operation of at least a portion of the inference models.

20 Claims, 11 Drawing Sheets

(56) References Cited

U.S. PATENT DOCUMENTS

| | | | | |
|---|---|---|---|---|
| 2016/0098297 | A1* | 4/2016 | Yuyitung | G06F 9/5055 718/104 |
| 2018/0365576 | A1 | 12/2018 | Guttmann | |
| 2019/0050505 | A1* | 2/2019 | Nendorf | G06F 9/46 |
| 2019/0102700 | A1* | 4/2019 | Babu | G06N 20/00 |
| 2019/0266504 | A1* | 8/2019 | Apparao | G06N 3/063 |
| 2020/0027157 | A1 | 1/2020 | Xu | |
| 2020/0104749 | A1* | 4/2020 | Sartorello | G06F 9/5083 |
| 2020/0145448 | A1 | 5/2020 | Vu | |
| 2020/0193218 | A1 | 6/2020 | Liu | |
| 2020/0193313 | A1 | 6/2020 | Ghanta | |
| 2020/0219007 | A1* | 7/2020 | Byers | G06F 9/50 |
| 2021/0255886 | A1* | 8/2021 | Von Niederhausern | G06F 16/90335 |
| 2021/0319098 | A1 | 10/2021 | Pogorelik | |
| 2022/0036160 | A1 | 2/2022 | Sasagawa | |
| 2022/0156368 | A1 | 5/2022 | Spyridopoulos | |
| 2022/0237506 | A1 | 7/2022 | Feldman | |
| 2022/0269835 | A1 | 8/2022 | Yang | |
| 2022/0414503 | A1 | 12/2022 | Park | |
| 2023/0010769 | A1 | 1/2023 | Umezawa | |
| 2023/0012487 | A1* | 1/2023 | Makaya | G06F 9/5027 |
| 2023/0168932 | A1 | 6/2023 | Rafferty | |
| 2023/0168950 | A1* | 6/2023 | Lee | G06N 20/00 719/328 |
| 2023/0252328 | A1* | 8/2023 | Swami | G06F 9/4818 706/52 |
| 2023/0267344 | A1* | 8/2023 | Chang | G06N 5/04 706/46 |
| 2023/0273813 | A1* | 8/2023 | Fong | G06F 9/4881 718/102 |
| 2023/0342203 | A1* | 10/2023 | Yang | G06F 9/5027 |
| 2024/0020296 | A1* | 1/2024 | Ezrielev | H04L 67/51 |
| 2024/0020555 | A1* | 1/2024 | Ezrielev | G06F 9/5083 |
| 2025/0030766 | A1 | 1/2025 | Dubey | |
| 2025/0265383 | A1* | 8/2025 | Nendorf | G06F 30/20 |

OTHER PUBLICATIONS

Eck, B., Fusco, F., Gormally, R., Purcell, M., & Tirupathi, S. (Mar. 24, 2020). “Scalable deployment of AI time-series models for IoT.” arXiv preprint arXiv:2003.12141. (7 pages).

Chen, B., Eck, B., Fusco, F., Gormally, R., Purcell, M., Sinn, M., & Tirupathi, S. (Nov. 2018). “Castor: Contextual IoT time series data and model management at scale.” In 2018 IEEE International Conference on Data Mining Workshops (ICDMW) (pp. 1487-1492). IEEE. Retrieved from <https://arxiv.org/pdf/1811.08566> on Oct. 10, 2025. (6 pages).

Saeed et al., “Model Adaptation and Personalization for Physiological Stress Detection.” Oct. 2018. (Year: 2018) Retrieved from <https://tstojan.github.io/pub/DSAA2018_ModelAdaptandPersonPhysiologicaStressDetection.pdf> on Oct. 13, 2025. (8 pages).

Zhang et al., “Bandwidth-Efficient Multi-Task AI Inference with Dynamic Task Importance for the Internet of Things in Edge Computing.” Aug. 2022. (Year: 2022) (13 pages).

Liang et al., “Model-driven Cluster Resource Management for AI Workloads in Edge Clouds”; arXiv:2201.07312v1 [cs.DC] Jan. 18, 2022; Total pp. 23 (Year: 2022), Retrieved from <https://arxiv.org/abs/2201.07312> on Sep. 2, 2025.

Filho et al., “A Systematic Literature Review on Distributed Machine Learning in Edge Computing”; Sensors 2022, 22, 2665. Published Mar. 23, 2022; Total pp. 36 (Year: 2022), Retrieved from <https://doi.org/10.3390/s22072665> on Sep. 2, 2025.

“Software performance testing”, Wikipedia, Wikimedia Foundation, https://en.wikipedia.org/wiki/Software_performance_testing (8 Pages).

“The Ultimate Guide to Performance Testing and Software Testing: Testing Types, Performance Testing Steps, Best Practices, and More”, Stackify, Apr. 16, 2021, https://stackify.com/ultimate-guide-performance-testing-and-software-testing/ (23 Pages).

“High availability software”, Wikipedia, Wikimedia Foundation, https://en.wikipedia.org/wiki/High_availability_software (5 Pages).

“Load balancing (computing)”, Wikipedia, Wikimedia Foundation, https://en.wikipedia.org/wiki/Load_balancing (computing) (17 Pages).

Thompson, Julie D. et al., “Multiple Sequence Alignment Using ClustalW and ClustalX”, Current Protocols in Bioinformatics (2003) 2.3.1-2.3.22 (22 Pages).

Zhao, Shixiong et al., “HAMS: High Availability for Distributed Machine Learning Service Graphs”, 2020 50th Annual IEEE/IFIP International Conference on Dependable Systems and Networks (DSN). IEEE, 2020 (13 Pages).

Hu, Chenghao et al., “Distributed Inference with Deep Learning Models across Heterogeneous Edge Devices.” IEEE INFOCOM 2022—IEEE Conference on Computer Communications. IEEE, 2022 (8 Pages).

Mao et al., “A Survey on Mobile Edge Computing: The Communication Perspective”, arXiv: 1701.01090v4 [cs.IT], Jun. 13, 2017 (37 pages).

Shi et al., “Communication-Efficient Edge AI: Algorithms and Systems”, arXiv: 2002.09668v1 [cs.IT], Feb. 22, 2020 (24 pages).

Filho et al., “A Systematic Literature Review on Distributed Machine Learning in Edge Computing”, sensors. retreived from <https://www.mdpi.com/1424-8220/22/7/2665> on Apr. 6, 2026, pp. 1-36, Mar. 30, 2022 (36 pages).

Liang et al., “Model-driven Cluster Resource Management forAI Workloads in Edge Clouds”, ACM Transactions on Autonomous and Adaptive Systems. vol. 18, Issue 1, retrieved from <https://dl.acm.org/doi/epdf/10.1145/3582080> on Apr. 6, 2026, pp. 1-27, Mar. 2023 (27 pages).

* cited by examiner

SYSTEM AND METHOD FOR EXECUTING MULTIPLE INFERENCE MODELS USING INFERENCE MODEL PRIORITIZATION

FIELD

Embodiments disclosed herein relate generally to inference generation. More particularly, embodiments disclosed herein relate to systems and methods to generate inferences across multiple data processing systems throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements

DETAILED DESCRIPTION

Figure 1:
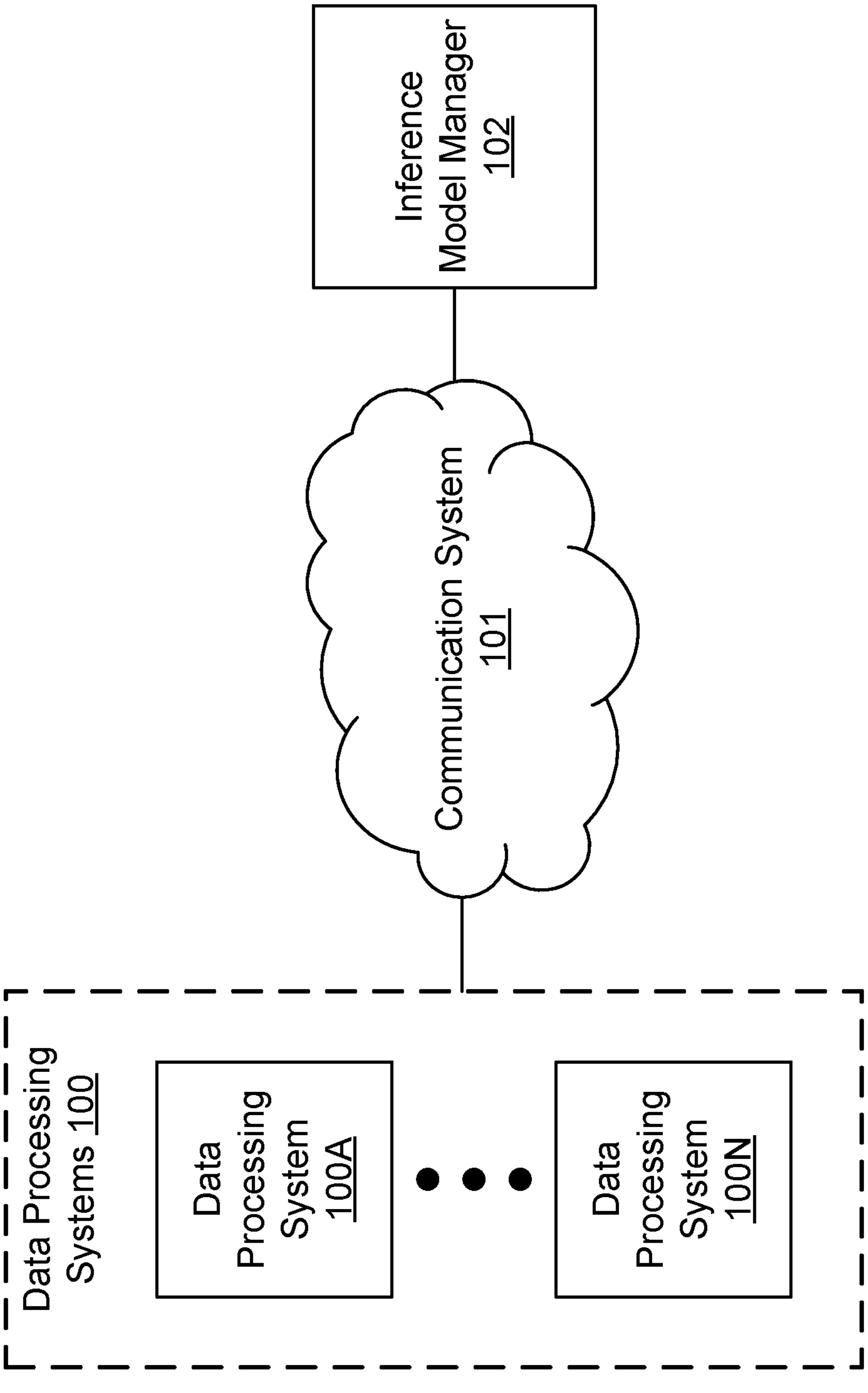
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing inference models hosted by data processing systems throughout a distributed environment. To manage execution of the inference models, the system may include an inference model manager and any number of data processing systems. The data processing systems responsible for hosting and operating the inference models may have access to a limited quantity of computing resources. In the event of termination or otherwise reduced functionality of one or more data processing systems, the system may no longer have access to sufficient computing resources to perform timely execution of the inference models in a manner that meets the needs of a downstream consumer.

To meet the needs of the downstream consumer, the inference model manager may dynamically re-assign the data processing systems to support continued operation of at least a portion of the inference models. If the data processing systems have access to insufficient computing resources to host and operate a total quantity of the inference models, the inference model manager may prioritize one or more of the inference models for continued operation. To do so, each inference model of the inference models may be assigned a priority ranking. The priority ranking may indicate a preference for future completion of inference generation by each inference model of the inference models. A higher priority ranking may specify a higher degree of preference to a downstream consumer. Therefore, the inference model manager may re-assign one or more data processing systems formerly hosting a lower priority inference model to a higher priority inference model. Consequently, downtime may be reduced for higher priority inference models. In addition, the computing resource capacity of the system may be continuously monitored, and functionality may be restored to lower priority inference models when sufficient computing resources become available to the system.

To initiate execution of the inference models, the inference model manager may distribute one or more inference models to the data processing systems in accordance with an execution plan. The execution plan may indicate an assurance level (e.g., an expected number of instances of each inference model) and a distribution location for each inference model to meet the needs of a downstream consumer. The execution plan may also indicate an operational capability data transmission schedule instructing the data processing systems to regularly transmit data related to their functionality to the inference model manager as described below.

To manage execution of the inference models, the inference model manager may collect operation capability data from each data processing system of the data processing systems. The operation capability data may indicate a type of inference model (e.g., a higher priority inference model, a lower priority inference model, etc.) hosted by the data processing system and a current computing resource capacity of the data processing system. The inference model manager may perform an analysis of the operation capability data to determine whether the system has access to sufficient computing resources to perform timely execution of the inference models in accordance with the execution plan.

In a first instance, the system may have sufficient computing resource capacity to complete timely execution of the inference models but may not fulfill all conditions of the execution plan (e.g., due to not meeting a threshold for an assurance level of one or more inference models and/or other reasons). Therefore, the inference model manager may re-assign one or more data processing systems to return to eventual compliance with the execution plan.

In a second instance, the system may not have sufficient computing resource capacity to complete timely execution of the inference models. Therefore, the inference model manager may re-assign one or more data processing systems in a manner that prioritizes operation of some inference models over other inference models based on the priority ranking of the inference models. For example, the inference model manager may re-assign a data processing system previously assigned to a lower priority inference model to a higher priority inference model to support timely execution of the higher priority inference model.

Thus, embodiments disclosed herein may provide an improved system for managing allocation of limited resources of a distributed environment among one or more inference models. The improved system may deploy inference models across multiple data processing systems and respond to changes in the availability and/or capacity (e.g., computing resource capacity) of the data processing systems to preferentially ensure continued operation of higher priority inference models over lower priority inference models. By managing the deployment of the inference models, a system in accordance with embodiments disclosed herein may re-assign data processing systems to remain in compliance with the needs of a downstream consumer such that the downstream consumer may more assuredly rely on at least the services provided by the higher priority inference models. By doing so, inference model performance may be adjusted dynamically, and functionality of at least the highest priority inference models may be maintained during disruptions to the data processing systems and/or changes to the needs of a downstream consumer.

In an embodiment, a method for managing inference models hosted by data processing systems to complete timely execution of the inference models is provided. The method may include: making a first determination, based on a result of a compliance analysis of operational capability data obtained from the data processing systems and a result of a capacity analysis of the operational capability data, regarding whether the inference models are likely to complete timely execution; in a first instance of the first determination where the inference models are unlikely to complete timely execution: making a second determination, based on the result of the capacity analysis, regarding whether the data processing systems have capacity to host a total quantity of inference models specified by an execution plan; in a first instance of the second determination where the data processing systems have insufficient capacity to host the total quantity of inference models: modifying the execution plan to obtain an updated execution plan, the execution plan being modified to retain a first assurance level for a first type of inference model of the inference models and reducing a second assurance level for a second type of inference model of the inference models, and modifying a deployment of the inference models based on the updated execution plan.

The method may also include: in a second instance of the second determination where the data processing systems have sufficient capacity to host the total quantity of inference models: modifying the execution plan to obtain an updated execution plan, the execution plan being modified to reassign a host for one inference model of the inference models to a new data processing system of the data processing systems; and modifying the deployment of the inference models based on the updated execution plan.

The first assurance level may specify a quantity of instances of the first type of inference model that are to be hosted by the data processing systems and the second assurance level may specify a quantity of instances of the second type of inference model that are to be hosted by the data processing systems.

The method may also include: prior to making the first determination: collecting the operational capability data from the data processing systems based on the execution plan for the inference models and a type of each inference model of the inference models that is hosted by the data processing systems.

The method may also include: prior to making the first determination and after collecting the operational capability data: performing a compliance analysis of the operational capability data to identify whether quantities of the types of each inference model of the inference models meet corresponding thresholds specified by the execution plan; and performing a capacity analysis of the operational capability data to identify a quantity of inference models that are executable by the data processing systems.

The execution plan may indicate: a priority ranking, the priority ranking indicating a preference for future completion of inference generation by each inference model of the inference models; and a computing resource requirement for each inference model of the inference models.

A higher priority ranking may specify a higher degree of preference to a downstream consumer.

The execution plan may indicate: an assurance level for each inference model of the inference models; an execution location for each inference model of the inference models; and an operational capability data transmission schedule for the data processing systems.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize inferences generated by executing inference models hosted by data processing systems throughout a distributed environment.

The system may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by the inference models hosted by the data processing systems throughout the distributed environment.

To facilitate execution of the inference models, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of the inference models.

For example, all, or a portion, of data processing systems 100 may provide computer-implemented services to users and/or other computing devices operably connected to data processing systems 100. The computer-implemented services may include any type and quantity of services including, for example, generation of a partial or complete processing result using an inference model of the inference models. Different data processing systems may provide similar and/or different computer-implemented services.

Inferences generated by the inference models may be utilized to provide computer-implemented services to a downstream consumer. The inference models may be hosted by data processing systems throughout a distributed environment. However, the data processing systems may be vulnerable to termination and/or diminished functionality due to environmental factors, unforeseen mechanical issues, or the like. In the event of termination and/or diminished functionality of one or more data processing systems, the data processing systems may no longer have access to sufficient computing resources to perform timely execution of the inference models in a manner that complies with the needs of the downstream consumer.

In addition, the quality of the computer-implemented services may depend on the accuracy of the inferences and, therefore, the complexity of the inference models. An inference model capable of generating accurate inferences may consume an undesirable quantity of computing resources during operation. The addition of a data processing system dedicated to hosting and operating an inference model may increase communication bandwidth consumption, power consumption, and/or computational overhead throughout the distributed environment. Therefore, each inference model of the inference models may be partitioned into inference model portions and distributed across multiple data processing systems to utilize available computing resources more efficiently throughout a distributed environment.

In general, embodiments disclosed herein may provide methods, systems, and/or devices for managing execution of one or more inference models across multiple data processing systems. To manage execution of the inference models across multiple data processing systems, a system in accordance with an embodiment may distribute portions of the inference models according to an execution plan. The execution plan may include instructions for timely execution of the inference models with respect to the needs of the downstream consumer of the inferences. If at least one of the data processing systems becomes unable to complete timely execution of one of the distributed inference model portions, data processing systems 100 may be dynamically re-assigned in a manner that prioritizes the operability of inference models with a higher priority ranking. By doing so, higher priority inference models may continue to generate inferences in the event of reduced computing resource capacity of the system.

Figure 3A:
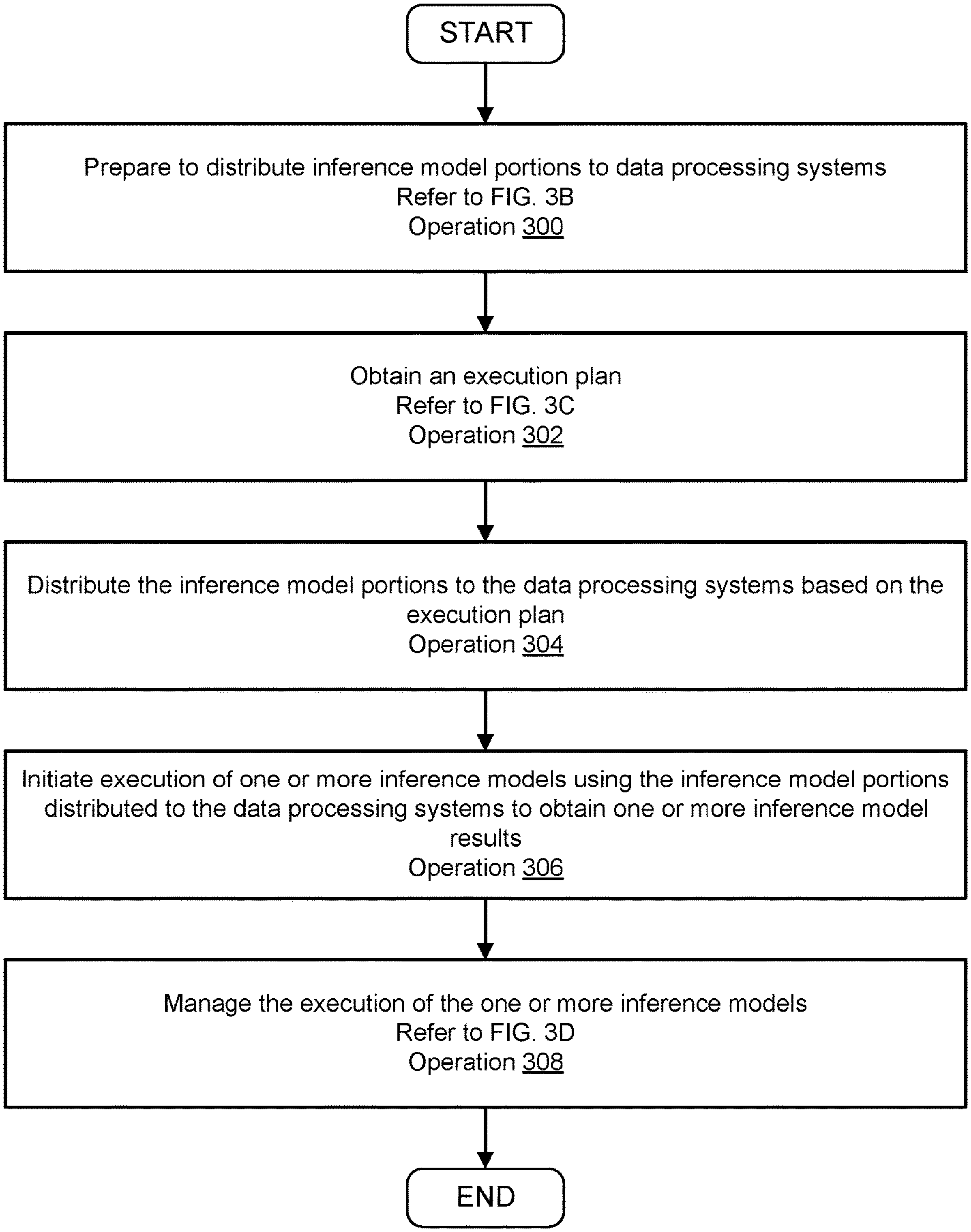
FIG. 3A shows a flow diagram illustrating a method of managing inference models hosted by data processing systems to complete timely execution of the inference models in accordance with an embodiment.
Figure 3B:
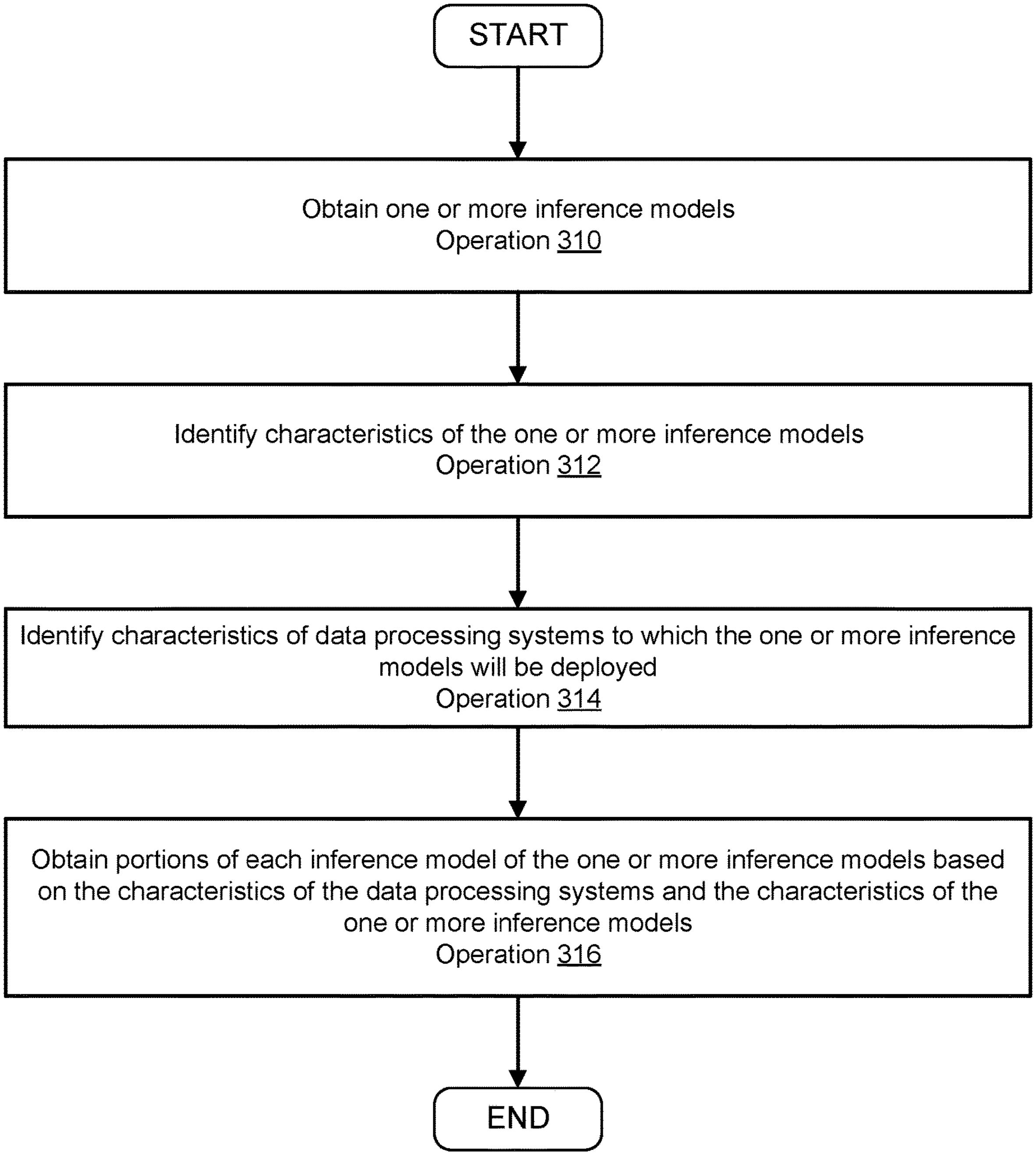
FIG. 3B shows a flow diagram illustrating a method of preparing to distribute inference model portions to data processing systems in accordance with an embodiment.
Figure 3C:
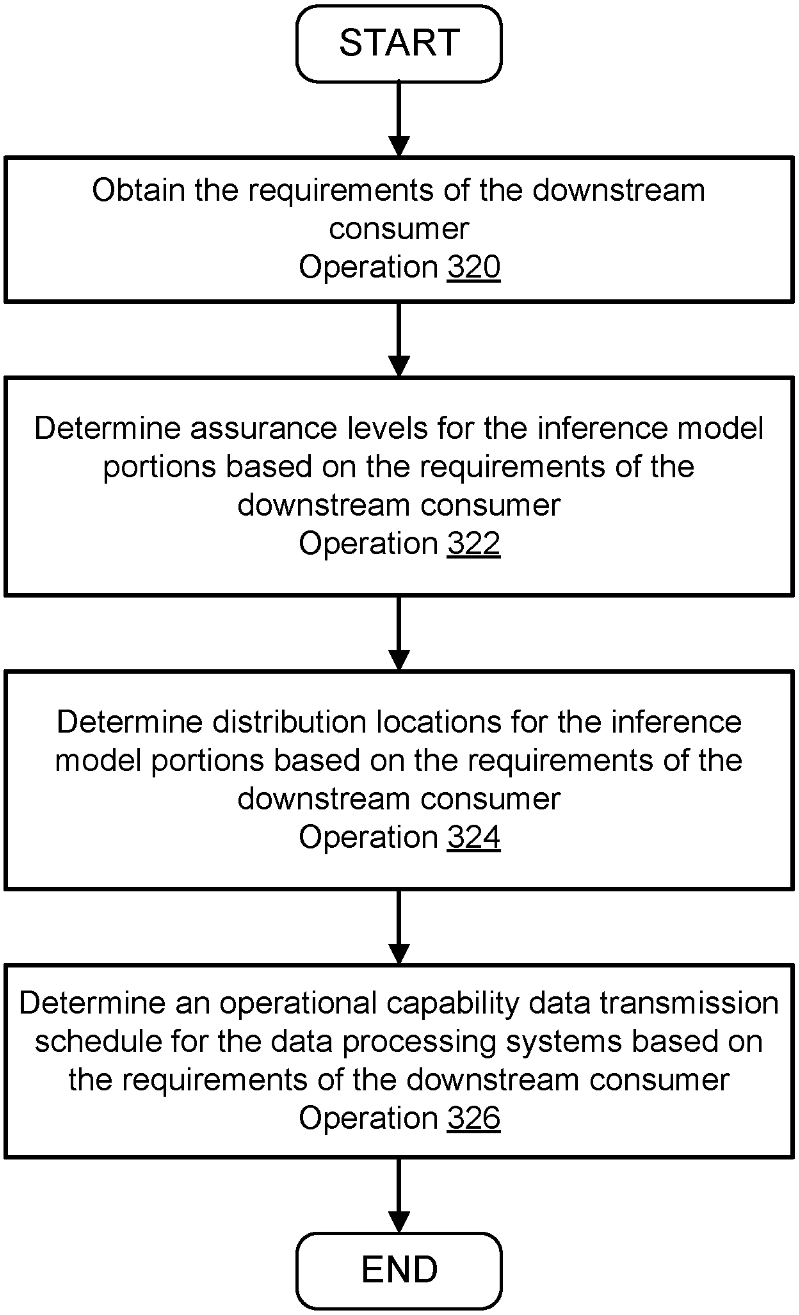
FIG. 3C shows a flow diagram illustrating a method of obtaining an execution plan in accordance with an embodiment.
Figure 3D:
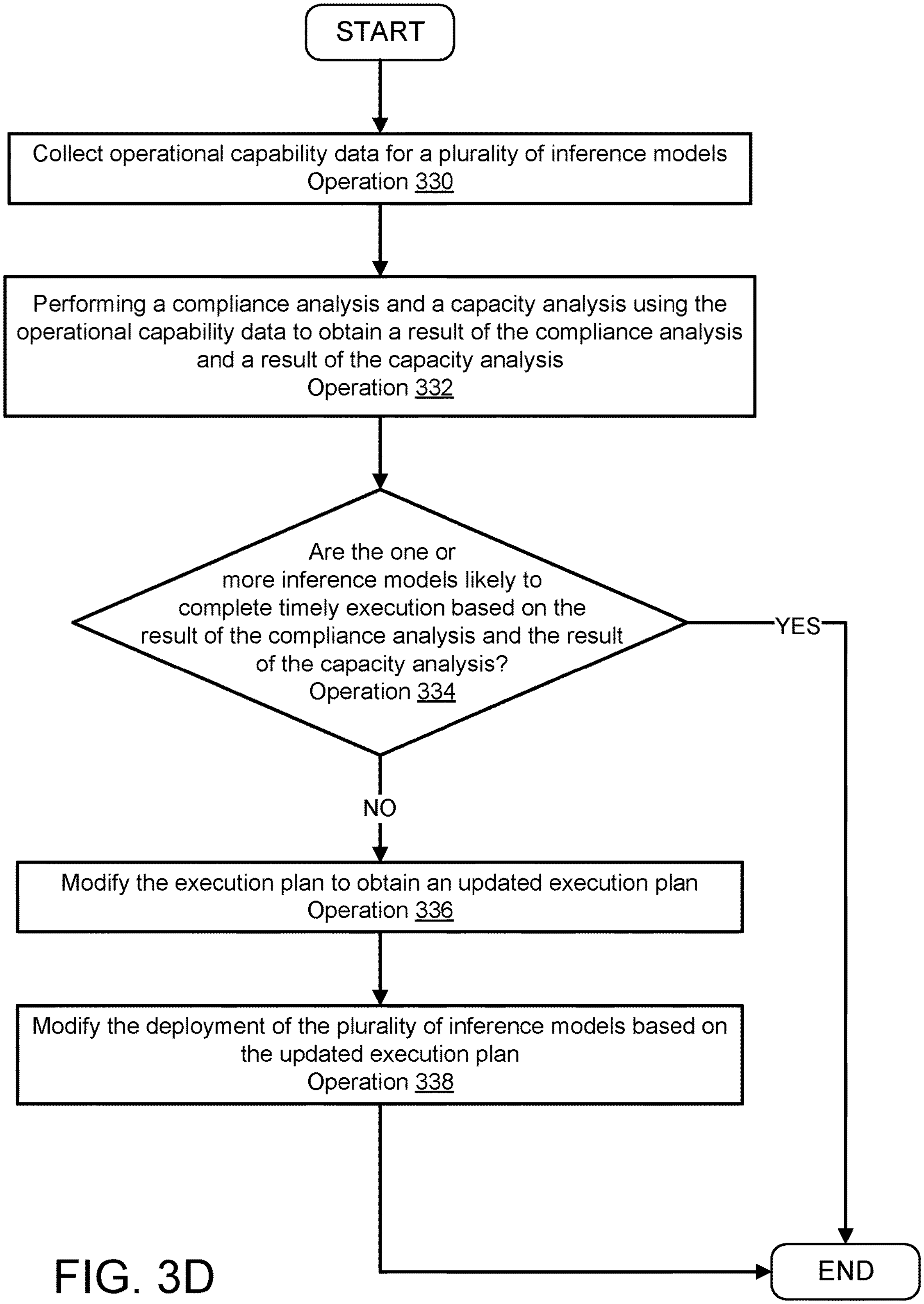
FIG. 3D shows a flow diagram illustrating a method of managing the execution of the inference models in accordance with an embodiment.

To provide its functionality, inference model manager 102 may (i) prepare to distribute inference model portions to data processing systems, and the inference model portions may be based on characteristics of the data processing system and characteristics of the inference models (Refer to FIG. 3B for further discussion), (ii) distribute the inference model portions to the data processing systems, (iii) initiate execution of the inference models using the inference model portions distributed to the data processing systems, and/or (iv) manage the execution of the inference models by monitoring the computing resource capacity of the data processing systems and dynamically re-assigning the data processing systems to provide continued execution of at least a portion of the inference models based on the needs of a downstream consumer (Refer to FIG. 3D for further discussion).

When performing its functionality, inference model manager 102 and/or data processing systems 100 may perform all, or a portion, of the methods and/or actions shown in FIGS. 3A-3D.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 and/or inference model manager 102 are implemented using an internet of things (IoT) device, which may include a computing device. The IoT device may operate in accordance with a communication model and/or management model known to inference model manager 102, other data processing systems, and/or other devices.

Any of the components illustrated in FIG. 1 may be operably connected to each other (and/or components not illustrated) with communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
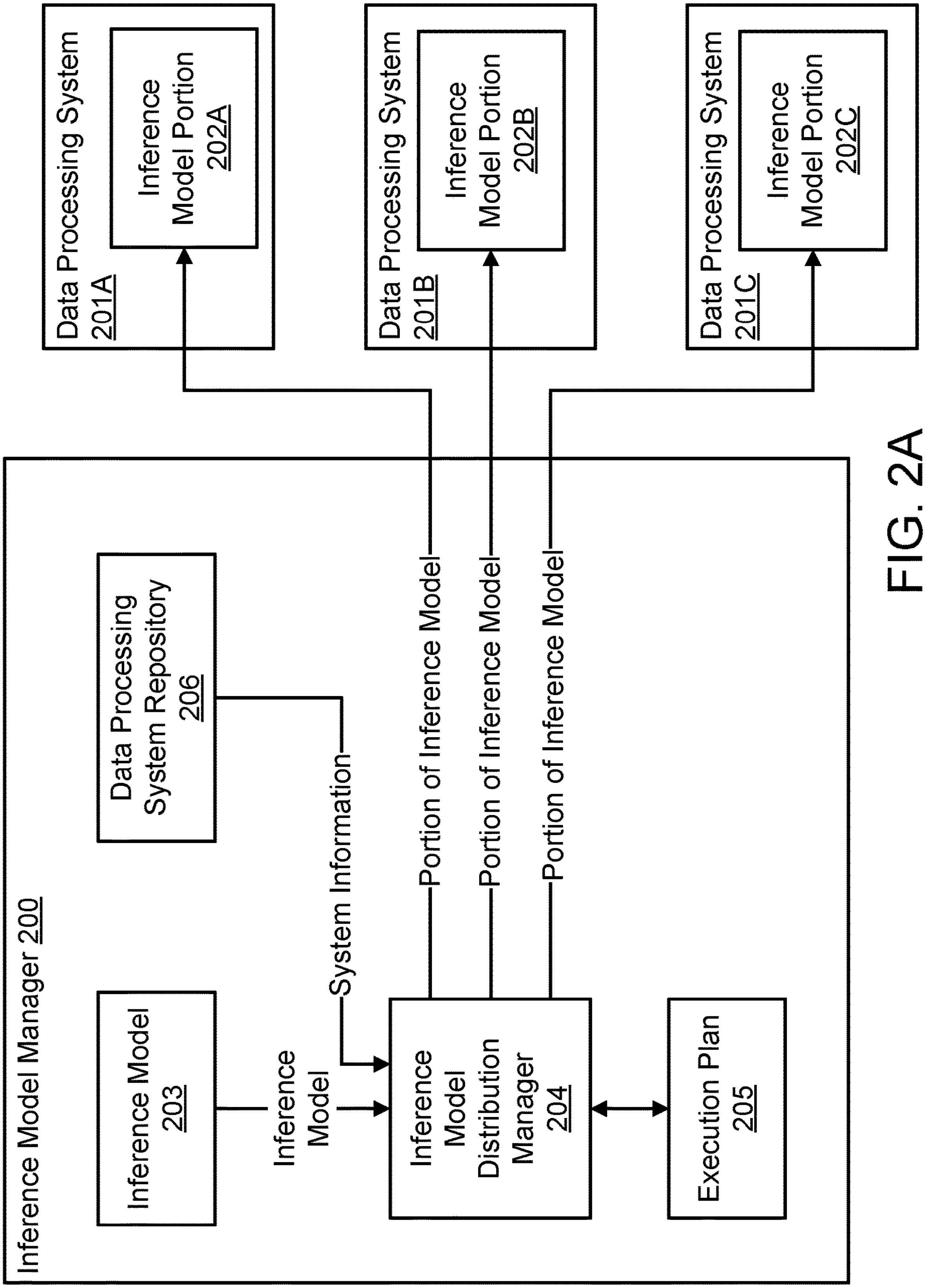
FIG. 2A shows a block diagram illustrating an inference model manager and multiple data processing systems over time in accordance with an embodiment.
Figure 2B:
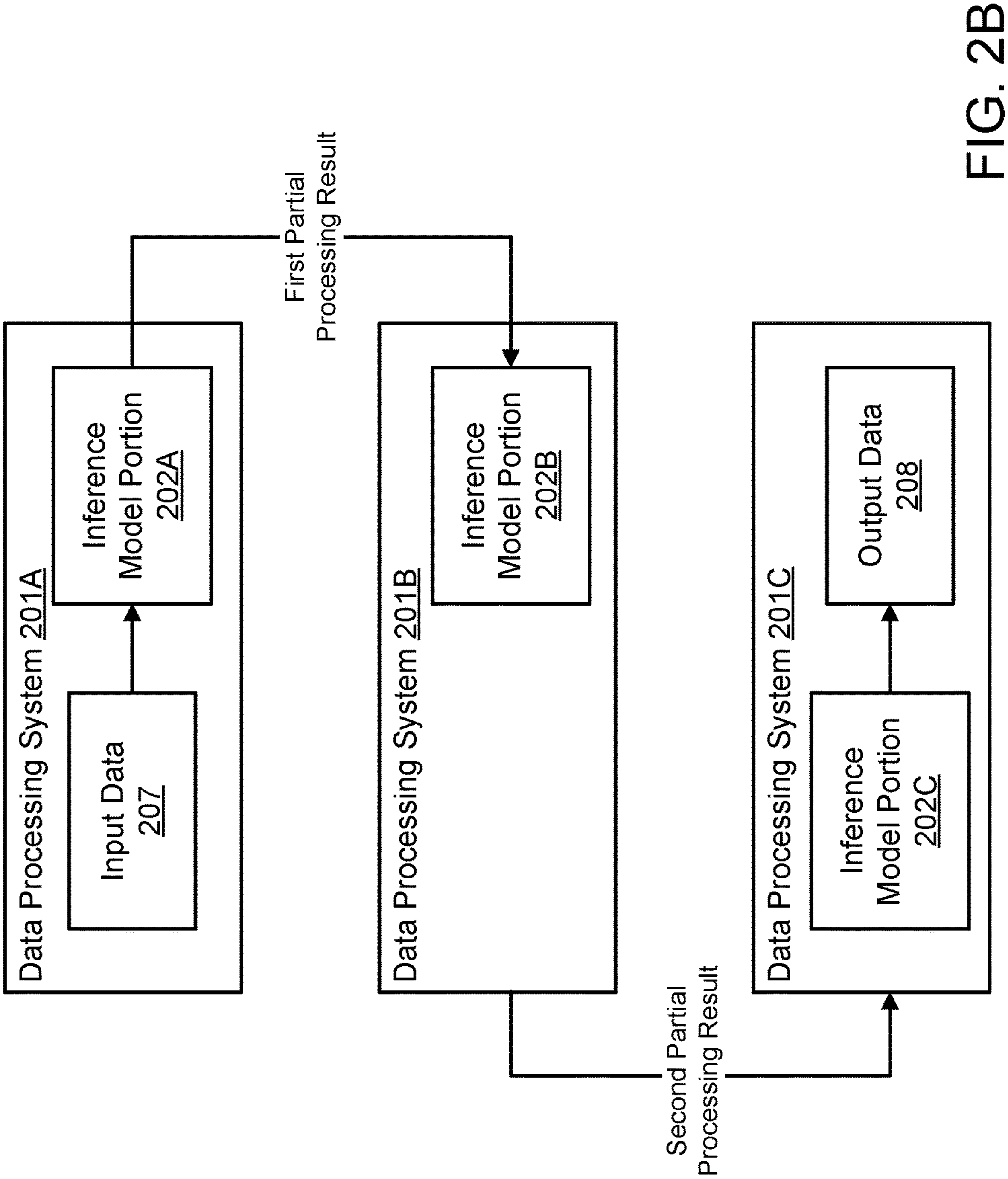
FIG. 2B shows a block diagram illustrating multiple data processing systems over time in accordance with an embodiment.

To further clarify embodiments disclosed herein, diagrams illustrating data flows and/or processes performed in a system in accordance with an embodiment are shown in FIGS. 2A-2B.

FIG. 2A shows a diagram of inference model manager 200 and data processing systems 201A-201C in accordance with an embodiment. Inference model manager 200 may be similar to inference model manager 102, and data processing systems 201A-201C may be similar to any of data processing systems 100. In FIG. 2A, inference model manager 200 and data processing systems 201A-201C are connected to each other via a communication system (not shown). Communications between inference model manager 200 and data processing systems 201A-201C are illustrated using lines terminating in arrows.

As discussed above, inference model manager 200 may perform computer-implemented services by executing one or more inference models across multiple data processing systems that each individually have insufficient computing resources to complete timely execution of the one or more inference models. The computing resources of the individual data processing systems may be insufficient due to: insufficient available storage to host an inference model of the one or more inference models and/or insufficient processing capability for timely execution of an inference model of the one or more inference models.

While described below with reference to a single inference model (e.g., inference model 203), the process may be repeated any number of times with any number of inference models without departing from embodiments disclosed herein.

To execute an inference model across multiple data processing systems, inference model manager 200 may obtain inference model portions and may distribute the inference model portions to data processing systems 201A-201C. The inference model portions may be based on: (i) the computing resource availability of data processing systems 201A-201C and (ii) communication bandwidth availability between the data processing systems. By doing so, inference model manager 200 may distribute the computational overhead and bandwidth consumption associated with hosting and operating the inference model across multiple data processing systems while reducing communications between data processing systems 201A-201C throughout the distributed environment.

To obtain inference model portions, inference model manager 200 may host inference model distribution manager 204. Inference model distribution manager 204 may (i) obtain an inference model, (ii) identify characteristics of data processing systems to which the inference model may be deployed, (iii) obtain inference model portions based on the characteristics of the data processing systems and characteristics of the inference model, (iv) obtain an execution plan based on the inference model portions, the characteristics of the data processing systems, and requirements of a downstream consumer (v) distribute the inference model portions to the data processing systems, (vi) initiate execution of the inference model using the inference model portions distributed to the data processing systems and/or (vii) manage the execution of the inference model based on the execution plan.

Inference model manager 200 may obtain inference model 203. Inference model manager 200 may obtain characteristics of inference model 203. The characteristics of inference model 203 may include, for example, a quantity of layers of a neural network inference model and a quantity of relationships between the layers of the neural network inference model. The characteristics of inference model 203 may also include the type of inference model (e.g., including the priority ranking of inference model 203) and the quantity of computing resources required to host and operate inference model 203. The characteristics of inference model 203 may include other characteristics based on other types of inference models without departing from embodiments disclosed herein.

Each portion of inference model 203 may be distributed to one data processing system throughout a distributed environment. Therefore, prior to determining the portions of inference model 203, inference model distribution manager 204 may obtain system information from data processing system repository 206. System information may include a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems.

Therefore, inference model distribution manager 204 may obtain a first portion of the inference model (e.g., inference model portion 202A) based on the system information (e.g., the available computing resources) associated with data processing system 201A and based on data dependencies of the inference model so that inference model portion 202A reduces the necessary communications between inference model portion 202A and other portions of the inference model. Inference model distribution manager 204 may repeat the previously described process for inference model portion 202B and inference model portion 202C.

Prior to distributing inference model portions 202A-202C, inference model distribution manager 204 may utilize inference model portions 202A-202C to obtain execution plan 205. Execution plan 205 may include instructions for timely execution of the inference model using the portions of the inference model and based on the needs of a downstream consumer of the inferences generated by the inference model. Refer to FIG. 3B for additional details regarding obtaining an execution plan.

Inference model manager 200 may distribute inference model portion 202A to data processing system 201A, inference model portion 202B to data processing system 201B, and inference model portion 202C to data processing system 201C. While shown in FIG. 2A as distributing three portions of the inference model to three data processing systems, the inference model may be partitioned into any number of portions and distributed to any number of data processing systems throughout a distributed environment. Further, while not shown in FIG. 2A, redundant copies of the inference model portions may also be distributed to any number of data processing systems in accordance with an execution plan.

Inference model manager 102 may initiate execution of the inference model using the portions of the inference model distributed to the data processing systems to obtain an inference model result (e.g., one or more inferences). The inference model result may be usable by a downstream consumer to perform a task, make a control decision, and/or perform any other action set (or action).

Inference model manager 102 may manage the execution of the inference model based on the execution plan. Managing execution of the inference model may include monitoring changes to a listing of data processing systems over time and/or revising the execution plan as needed to obtain the inference model result in a timely manner and/or in compliance with the needs of a downstream consumer. An updated execution plan may include re-assignment of data processing systems to new portions of the inference model and/or re-location of data processing systems to meet the needs of the downstream consumer. When providing its functionality, inference model manager 102 may use and/or manage agents across any number of data processing systems. These agents may collectively provide all, or a portion, of the functionality of inference model manager 102. As previously mentioned, the process shown in FIG. 2A may be repeated to distribute portions of any number of inference models to any number of data processing systems.

Turning to FIG. 2B, data processing systems 201A-201C may execute the inference model. To do so, data processing system 201A may obtain input data 207. Input data 207 may include any data of interest to a downstream consumer of the inferences. For example, input data 207 may include data indicating the operability and/or specifications of a product on an assembly line.

Input data 207 may be fed into inference model portion 202A to obtain a first partial processing result. The first partial processing result may include values and/or parameters associated with a portion of the inference model. The first partial processing result may be transmitted (e.g., via a wireless communication system) to data processing system 201B. Data processing system 201B may feed the first partial processing result into inference model portion 202B to obtain a second partial processing result. The second partial processing result may include values and/or parameters associated with a second portion of the inference model. The second partial processing result may be transmitted to data processing system 201C. Data processing system 201C may feed the second partial processing result into inference model portion 202C to obtain output data 208. Output data 208 may include inferences collectively generated by the portions of the inference model distributed across data processing systems 201A-201C.

Output data 208 may be utilized by a downstream consumer of the data to perform a task, make a decision, and/or perform any other action set that may rely on the inferences generated by the inference model. For example, output data 208 may include a quality control determination regarding a product manufactured in an industrial environment. Output data 208 may indicate whether the product meets the quality control standards and should be retained or does not meet the quality control standards and should be discarded. In this example, output data 208 may be used by a robotic arm to decide whether to place the product in a "retain" area or a "discard" area.

While shown in FIG. 2B as including three data processing systems, a system may include any number of data processing systems to collectively execute the inference model. Additionally, as noted above, redundant copies of the inference model hosted by multiple data processing systems may each be maintained so that termination of any portion of the inference model may not impair the continued operation of the inference model. In addition, while described in FIG. 2B as including one inference model, the system may include multiple inference models distributed across multiple data processing systems.

While described above as feeding input data 207 into data processing system 201A and obtaining output data 208 via data processing system 201C, other data processing systems may utilize input data and/or obtain output data without departing from embodiments disclosed herein. For example, data processing system 201B and/or data processing system 201C may obtain input data (not shown). In another example, data processing system 201A and/or data processing system 201B may generate output data (not shown). A downstream consumer may be configured to utilize output data obtained from data processing system 201A and/or data processing system 201B to perform a task, make a decision, and/or perform an action set.

Each of data processing systems 201A-201C may transmit operational capability data to inference model manager 102 (not shown) at variable time intervals as designated by an execution plan. Data processing systems 201A-201C may transmit the operational capability data to maintain membership in a listing of functional data processing systems throughout the distributed environment, to report their current computing resource capacity, and/or for other reasons. In the event that one of data processing systems 201A-201C may not transmit the operational capability data at the designated time, inference model manager 102 may obtain an updated execution plan and/or re-assign the inference model portions hosted by the data processing systems (described with more detail with respect to FIG. 3D).

By executing one or more inference models across multiple data processing systems, computing resource expenditure throughout the distributed environment may be reduced. In addition, by managing execution of the inference models, the functionality of the data processing systems may be adapted over time to remain in compliance with the needs of a downstream consumer.

In an embodiment, inference model distribution manager 204 is implemented using a processor adapted to execute computing code stored on a persistent storage that when executed by the processor performs the functionality of inference model distribution manager 204 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to execute inference models throughout a distributed environment. FIGS. 3A-3D illustrate methods that may be performed by the components of FIG. 1. In the diagrams discussed below and shown in FIGS. 3A-3D, any of the operations may be repeated, performed in different orders, and/or performed in parallel with or in a partially overlapping in time manner with other operations.

Turning to FIG. 3A, a flow diagram illustrating a method of managing inference models hosted by data processing systems to complete timely execution of the inference models in accordance with an embodiment is shown.

At operation 300, the inference model manager may prepare to distribute inference model portions to data processing systems. To prepare to distribute inference model portions, the inference model manager may obtain one or more inference models, may identify characteristics of the inference models (e.g., computing resource requirements, priority rankings, or the like), may identify characteristics of the data processing systems, and may obtain portions of each inference model based on the characteristics of the inference models and the characteristics of the data processing systems. Refer to FIG. 3B for additional details regarding this preparation operation.

At operation 302, the inference model manager may obtain an execution plan. The execution plan may be based on the inference model portions, the characteristics of the data processing systems, and requirements of a downstream consumer. The execution plan may include: (i) instructions for obtaining portions of the inference models, (ii) instructions for distribution of the inference models, (iii) instructions for execution of the inference models, and/or other instructions. The execution plan may be obtained to facilitate timely execution of the inference models in accordance with the needs of a downstream consumer of the inferences generated by the inference models. The execution plan may be obtained by generation by inference model manager 102 and/or received from another entity throughout the distributed environment. Refer to FIG. 3C for additional details regarding obtaining an execution plan.

At operation 304, the inference model portions are distributed to the data processing systems based on the execution plan. The inference model portions may be distributed to data processing systems in a manner that reduces communications between data processing systems during execution of the inference models and utilizes the available computing resources of each data processing system. One inference model portion of the inference model portions may be distributed to each data processing system of the data processing systems. The inference model portions may be distributed by sending copies of the inference model portions to corresponding data processing systems (e.g., via one or more messages), by providing the data processing systems with information that allows the data processing system to retrieve the inference model portions, and/or via other methods.

At operation 306, execution of the one or more inference models is initiated using the portions of the inference model distributed to the data processing systems to obtain one or more inference model results. The inference models may be executed in accordance with the execution plan. Inference model manager 102 may execute the inference models by sending instructions and/or commands to data processing systems 100 to initiate execution of the inference models.

In an embodiment, the inference models may be executed using input data. The input data may be obtained by inference model manager 102, any of data processing systems 100, and/or another entity. Inference model manager 102 may obtain the input data and transmit the input data to a first data processing system of data processing systems 100 along with instructions for timely executing a first inference model of the inference models based on the input data. The instructions for timely execution of the first inference model may be based on the needs of a downstream consumer with respect to the inferences generated by the first inference model. The inference models may ingest the input data during their execution and provide an output (e.g., an inference) based on the ingest.

At operation 308, execution of the one or more inference models is managed by the inference model manager. Execution of the inference models may be managed by collecting operational capability data for the inference models from the data processing systems and performing a compliance analysis and a capacity analysis of the operational capability data. The results of the compliance analysis and capacity analysis may indicate whether the data processing systems are capable of performing timely execution of the inference models in accordance with the execution plan. If the data processing systems are not capable of performing timely execution of the inference models in accordance with the execution plan, the inference model manager may re-assign one or more data processing systems to ensure continued operation of at least a portion of the inference models. Refer to FIG. 3D for additional details regarding managing the execution of the inference models.

Managing the execution of the inference models may be performed by inference model manager 102 and/or data processing systems 100. In a first example, the system may utilize a centralized approach to managing the execution of the inference models. In the centralized approach, an off-site entity (e.g., a data processing system hosting inference model manager 102) may make decisions and perform the operations detailed in FIG. 3D. In a second example, the system may utilize a de-centralized approach to managing the execution of the inference models. In the de-centralized approach, data processing systems 100 may collectively make decisions and perform the operations detailed in FIG. 3D. In a third example, the system may utilize a hybrid approach to managing the execution of the inference models. In the hybrid approach, and offsite entity may make high-level decisions (e.g., whether the data processing systems are in compliance with the needs of the downstream consumer) and may delegate implementation-related decisions (e.g., how to modify the execution plan and implement the updated execution plan) to data processing systems 100. The inference models may be managed via other methods without departing from embodiments disclosed herein.

The method may end following operation 308.

Turning to FIG. 3B, a method of preparing to distribute inference model portions to data processing systems in accordance with an embodiment is shown. The operations shown in FIG. 3B may be an expansion of operation 300 in FIG. 3A.

At operation 310, one or more inference models are obtained. The inference models may be implemented with, for example, neural network inference models. The inference models may generate inferences that may be usable to downstream consumers.

In an embodiment, the inference models may be obtained by inference model manager 102 using training data sets. The training data sets may be fed into the neural network inference models (and/or any other type of inference generation models) to obtain the inference models. The inference models may also be obtained from another entity through a communication system. For example, an inference model may be obtained by another entity through training a neural network inference model and providing the trained neural network inference model to inference model manager 102.

At operation 312, characteristics of the one or more inference models are identified. The characteristics of the inference models may include a computing resource requirement for each inference model, a priority ranking for each inference model, and/or other characteristics. The priority ranking may indicate a preference for future completion of inference generation by each inference model of the inference models. A higher priority ranking may indicate a higher degree of preference to a downstream consumer. For example, a first inference model may be assigned a higher priority ranking and a second inference model may be assigned a lower priority ranking. The inferences generated by the first inference model may be critical to an industrial process overseen by the downstream consumer. The inferences generated by the second inference model may include supplemental information related to the industrial process. The supplemental information may be of interest to the downstream consumer but may not be critical to the industrial process. The priority rankings may be used by the inference model manager to determine how to ration computing resources among the inference models in the event of termination and/or diminished functionality of one or more data processing systems. Refer to FIG. 3D for additional details regarding utilizing priority rankings to ration computing resources among available data processing systems.

In an embodiment, characteristics of the one or more inference models may be identified by obtaining the characteristics of the one or more inference models from a downstream consumer. For example, the downstream consumer may transmit at least a portion of the characteristics of the one or more inference models (e.g., the priority rankings) to inference model manager 102 via one or more messages. Alternatively, priority rankings (and/or other characteristics of the one or more inference models) may be obtained by another entity (e.g., a data aggregator) and provided to inference model manager 102. Inference model manager 102 may also be provided with instructions for retrieval of the characteristics of the one or more inference models from an inference model characteristic repository hosted by another entity throughout the distributed environment.

In another embodiment, inference model manager 102 may identify the characteristics of the one or more inference models by performing an analysis of the inference models trained by inference model manager 102. The characteristics of the one or more inference models may be identified from other sources and/or via other methods without departing from embodiments disclosed herein.

As previously mentioned, each inference model may have a corresponding computing resource requirement, the computing resource requirement indicating the quantity of computing resources (e.g., storage, memory, processing resources, etc.) required to host and operate the inference model.

At operation 314, characteristics of data processing systems to which the inference models may be deployed are identified. Characteristics of the data processing systems may include a quantity of the data processing systems, a quantity of available storage of each data processing system of the data processing systems, a quantity of available memory of each data processing system of the data processing systems, a quantity of available communication bandwidth between each data processing system of the data processing system and other data processing systems of the data processing systems, and/or a quantity of available processing resources of each data processing system of the data processing systems.

In an embodiment, the characteristics of the data processing systems may be provided to inference model manager 102 by data processing systems 100, and/or by any other entity throughout the distributed environment. The characteristics of the data processing systems may be transmitted to inference model manager 102 as part of the operational capability data according to instructions specified by the execution plan. As an example, the execution plan may instruct the data processing systems to transmit operational capability data at regular intervals (e.g., once per hour, once per day, etc.). Alternatively, the characteristics of the data processing systems may be transmitted by data processing systems 100 to inference model manager 102 upon request by inference model manager 102. Inference model manager 102 may request a transmission from data processing systems 100 and/or from another entity (e.g., a data aggregator) responsible for aggregating data related to the characteristics of the data processing systems. The characteristics of the data processing systems may be utilized by inference model manager 102 to obtain portions of inference models as described below.

At operation 316, portions of each inference model are obtained based on the characteristics of the data processing systems and the characteristics of the inference models. To obtain the portions of the inference models, inference model manager 102 may, for example, represent a neural network inference model as a bipartite graph, the bipartite graph indicating data dependencies between nodes in the neural network inference model. Refer to FIG. 2A for additional details regarding obtaining portions of an inference model.

In an embodiment, portions of each inference model may be obtained by another entity throughout the distributed environment via any method. The other entity may transmit the portions of the inference models (and/or instructions for obtaining the portions of the inference models) to inference model manager 102.

Turning to FIG. 3C, a method of obtaining an execution plan in accordance with an embodiment is shown. The operations shown in FIG. 3C may be an expansion of operation 302 in FIG. 3A.

At operation 320, requirements of the downstream consumer are obtained. The requirements of the downstream consumer may include assurance levels for each portion of each inference model, execution locations for each portion of each inference model, an operational capability data transmission schedule for the data processing systems, and/or other requirements.

In an embodiment, requirements of the downstream consumer may be obtained by inference model manager 102 directly from the downstream consumer prior to initial deployment of the inference models, at regular intervals, and/or in response to an event instigating a change in the requirements of the downstream consumer. In another embodiment, another entity (e.g., a downstream consumer data aggregator) may aggregate data related to the needs of one or more downstream consumers throughout a distributed environment and may transmit this information to inference model manager 102 as needed.

At operation 322, assurance levels are determined for each inference model portion. Assurance levels may indicate a quantity of instances of a corresponding inference model portion that are to be hosted by the data processing systems. For example, a first inference model may be partitioned into a first portion and a second portion. The assurance level for the first inference model may specify that two instances of the first portion and three instances of the second portion must be operational to comply with the needs of the downstream consumer.

In an embodiment, the assurance levels may be based on inference model redundancy requirements indicated by the downstream consumer at any time and/or may be included in the requirements of the downstream consumer obtained in operation 320. The assurance levels may be transmitted to inference model manager 102 directly from the downstream consumer, may be obtained from another entity responsible for determining assurance levels based on the needs of the downstream consumer, and/or from other sources. Alternatively, inference model redundancy requirements of the downstream consumer may be transmitted from the downstream consumer to inference model manager 102 and inference model manager 102 may determine the assurance levels based on the inference model redundancy requirements.

At operation 324, distribution locations are determined for the inference model portions based on the requirements of the downstream consumer. Distribution locations (e.g., execution locations) may be selected to reduce geographic clustering of redundant instances of the inference model portions. In an embodiment, the distribution locations may be included in the needs of the downstream consumer obtained in operation 320. Alternatively, inference model manager 102 (and/or another entity) may obtain the needs of the downstream consumer and may determine the distribution locations based on the needs of the downstream consumer.

At operation 326, an operational capability data transmission schedule is determined for the data processing systems based on the requirements of the downstream consumer. The operational capability data transmission schedule may instruct data processing systems to transmit operational capability data to inference model manager 102 at various time intervals. For example, the operation of a downstream consumer may be highly sensitive to variations in transmissions of the inferences generated by the inference model (e.g., latencies in receiving inferences due to communication pathway bottlenecks). Therefore, the downstream consumer may require frequent updates to the execution plan. To do so, inference model manager 102 may determine an operational capability data transmission schedule of five transmissions per hour. In another example, the operation of a second downstream consumer may not be highly sensitive to variations in transmissions of the inferences generated by the inference model (e.g., latencies in receiving inferences due to communication pathway bottlenecks). Therefore, the downstream consumer may not require frequent updates to the execution plan and inference model manager may determine an operational capability data transmission schedule of one transmission per day.

In an embodiment, the operational capability data transmission schedule may be determined by inference model manager 102 based on the needs of the downstream consumer. To do so, the downstream consumer (and/or another entity throughout the distributed environment) may transmit operational capability data transmission frequency requirements to inference model manager 102. Inference model manager 102 may then determine the operational data transmission schedule based on the operational capability data transmission frequency requirements. In another embodiment, the operational capability data transmission schedule may be determined by the downstream consumer (and/or other entity) and instructions to implement the operational capability data transmission schedule may be transmitted to inference model manager 102.

The method may end following operation 326.

Turning to FIG. 3D, a method of managing the execution of the one or more inference models in accordance with an embodiment is shown. The operations shown in FIG. 3D may be an expansion of operation 308 in FIG. 3A.

At operation 330, operational capability data is collected for one or more inference models from the multiple data processing systems. Operational capability data may identify the type of each inference model hosted by each data processing system and the location of each data processing system. In addition, operational capability data may include a current computational resource capacity of each data processing system and/or other data.

In an embodiment, inference model manager 102 may collect the operational capability data from each data processing system of the data processing systems. In another embodiment, another entity (e.g., an operational capability data manager) may collect the operational capability data from the data processing systems and provide the operational capability data to inference model manager 102. In another embodiment, data processing systems 100 may provide inference model manager 102 with instructions for retrieval of the operational capability data from data processing systems 100. Operational capability data may be obtained continuously, at various time intervals, and/or upon request by inference model manager 102 or the downstream consumer.

Operational capability data may be obtained via other methods without departing from embodiments disclosed herein.

At operation 332, a compliance analysis and a capacity analysis are performed using the operational capability data to obtain a result of the compliance analysis and a result of the capacity analysis. The compliance analysis may identify whether quantities of the types of each inference model of the inference models deployed to data processing systems 100 meet corresponding thresholds specified by the execution plan.

The compliance analysis may be performed by inference model manager 102, data processing systems 100, and/or any other entity throughout the distributed environment. In an embodiment, inference model manager 102 may generate a listing of the quantities of each inference model currently hosted by data processing systems 100. The listing may be based, at least in part, on the most recent operational capability data obtained from the data processing systems. Alternatively, another entity may aggregate operational capability data from data processing systems 100 to create the listing and may transmit the listing to inference model manager 102. Inference model manager 102 may determine whether the listing meets the thresholds for each inference model specified by the execution plan to obtain the result of the compliance analysis.

The capacity analysis may identify a quantity of inference models that are executable by the multiple data processing systems. The capacity analysis may be performed by inference model manager 102, data processing systems 100, and/or any other entity throughout the distributed environment. In an embodiment, inference model manager 102 may obtain a current computing resource capacity of each data processing system of data processing systems 100 based, at least in part, on the operational capability data. By doing so, inference model manager 102 may determine a total quantity of computing resources available to data processing systems 100. Alternatively, the total quantity of computing resources available to data processing systems 100 may be determined by data processing systems 100 (and/or another entity) and transmitted to inference model manager 102.

Inference model manager 102 may determine the quantity of inference models that are executable by data processing systems 100 based on: (i) the total quantity of computing resources available to data processing systems 100, (ii) the computing resource requirements of each inference model of the inference models, and/or (iii) the assurance levels for each inference model of the inference models specified by the execution plan. The result of the capacity analysis may indicate whether the quantity of inference models that are executable by the data processing systems fulfills the execution plan.

At operation 334, it is determined whether the one or more inference models are likely to complete timely execution. The determination may be based on: (i) the result of the compliance analysis and (ii) the result of the capacity analysis. The result of the compliance analysis may indicate whether the quantity of the types of inference models deployed to the data processing systems fulfills the execution plan (and, therefore, the needs of the downstream consumer). The result of the capacity analysis may indicate whether the total quantity of inference models capable of being executed by the data processing systems fulfills the execution plan (and, therefore, the needs of the downstream consumer). The result of the compliance analysis and the result of the capacity analysis may be obtained by inference model manager 102 by generating the results and/or by receiving the results from another entity performing the compliance analysis and the capacity analysis (via one or more messages). In a first instance of the determination where the inference models are likely to complete timely execution (due to the compliance analysis and/or the capacity analysis indicating that the execution plan is not fulfilled), the method may end following operation 334.

In a second instance of the determination in which the inference models are unlikely to complete timely execution, the method may proceed to operation 336.

At operation 336, the execution plan may be modified to obtain an updated execution plan. The execution plan may be modified based on (i) the result of the compliance analysis, and/or (ii) the result of the capacity analysis. If the result of the compliance analysis indicates that the data processing systems have insufficient capacity to host the total quantity of inference models, the inference model manager may modify the execution plan to obtain an updated execution plan. The updated execution plan may be modified to retain a first assurance level for a first type of inference model and may reduce a second assurance level for a second type of inference model. The first assurance level may specify a quantity of instances of the first type of inference model that are to be hosted by the data processing systems and the second assurance level may specify a quantity of instances of the second type of inference model that are to be hosted by the data processing systems.

For example, the first assurance level may indicate that two instances of a high priority inference model (e.g., the first type) may be hosted by the data processing systems. Similarly, the second assurance level may indicate that two instances of a low priority inference model (e.g., the second type) may be hosted by the data processing systems. Due to a lack of available computing resources throughout the distributed environment, inference model manager 102 may reduce the second assurance level (e.g., by changing the second assurance level from two instances of the low priority inference model to one instance of the low priority inference model) and may retain the first assurance level.

If the result of the capacity analysis indicates that the data processing systems have insufficient capacity to host the total quantity of inference models, inference model manager 102 may modify the execution plan to obtain an updated execution plan. The updated execution plan may be modified to re-assign a host for one of the inference models to a new data processing system of the data processing systems.

In an embodiment, the assurance levels specified by the execution plan may not be met even though all inference models are able to operate throughout the distributed environment. For example, previously un-assigned data processing systems (e.g., data processing systems with no inference model portions deployed) may be available for re-assignment. Additionally, redundant copies of portions of the inference models may have been deployed to data processing systems beyond the assurance levels dictated by the needs of the downstream consumer. The data processing systems hosting redundant copies of portions of the inference models may be re-assigned to host other portions of the inference models in a manner that provides eventual compliance with the needs of the downstream consumer.

At operation 338, the deployment of the one or more inference models is modified based on the updated execution plan. The inference model manager 102 may deploy inference model portions, if necessary, to re-assigned data processing systems in accordance with the updated execution plan. Alternatively, the inference model portions may be transmitted to re-assigned data processing systems from another entity (e.g., another inference model manager) throughout the same and/or a similar distributed environment.

The method may end following operation 338.

Figure 4A:
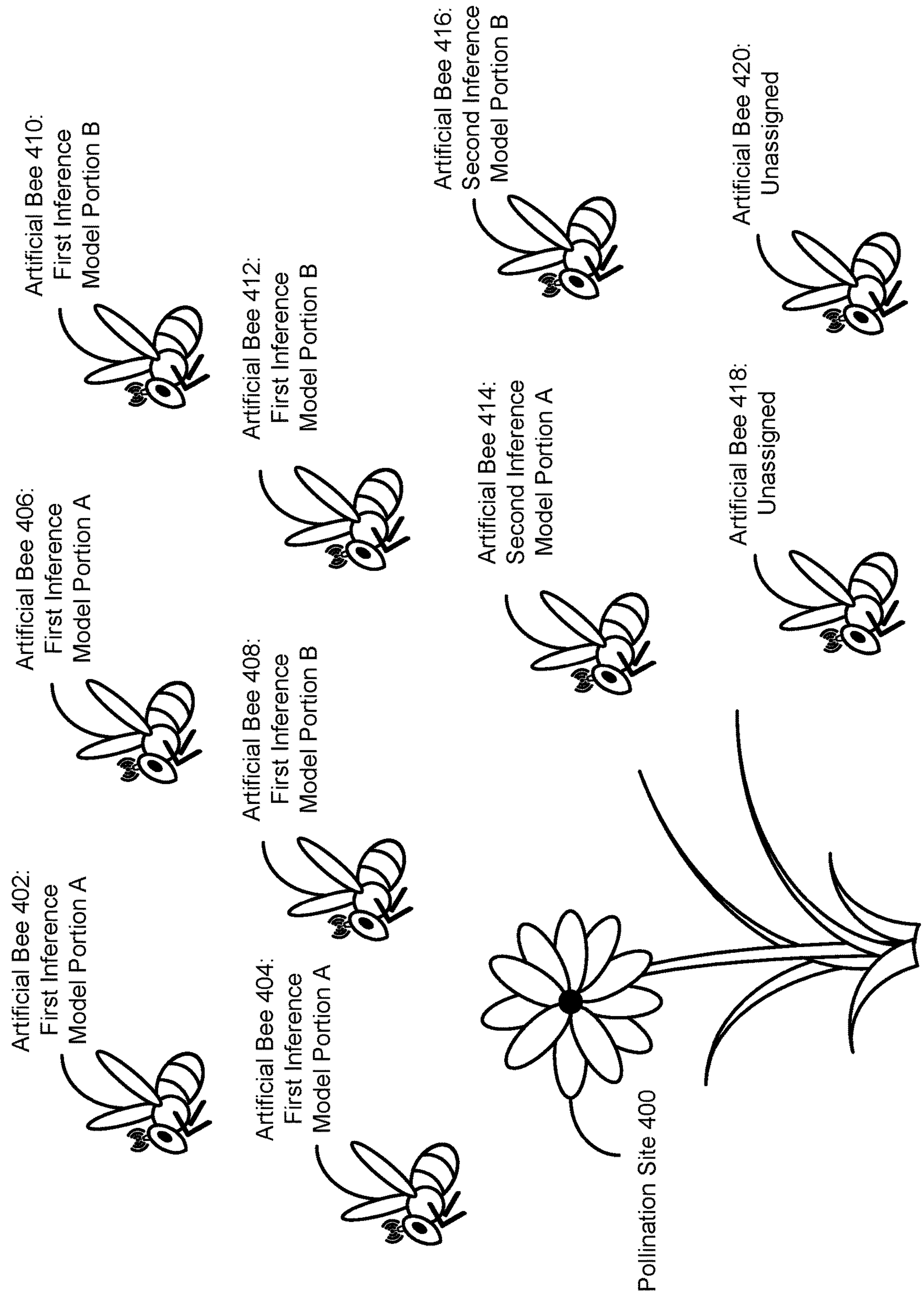
FIGS. 4A-4C show diagrams illustrating a method of executing inference models across multiple data processing systems over time in accordance with an embodiment.
Figure 4B:
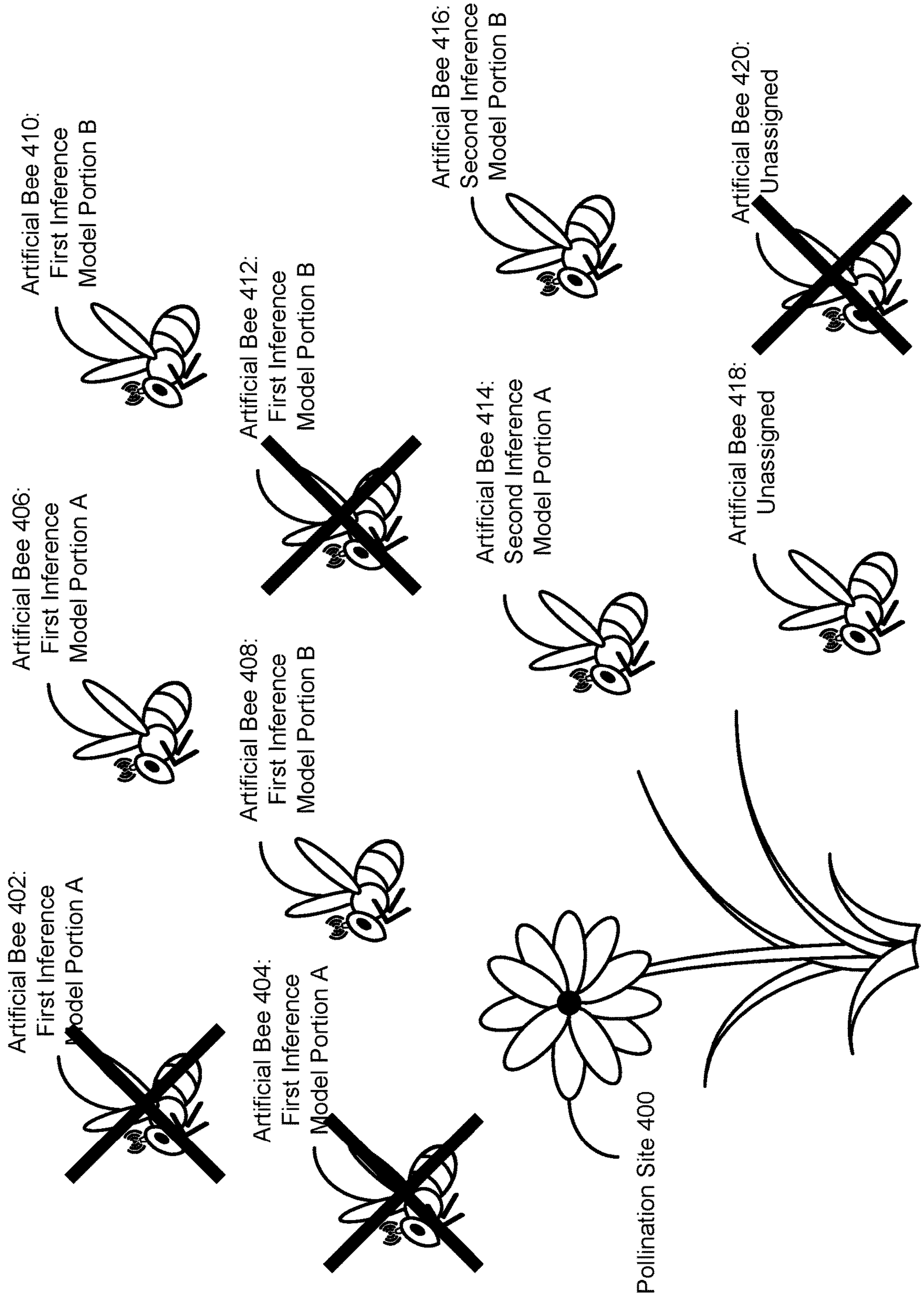
Figure 4C:
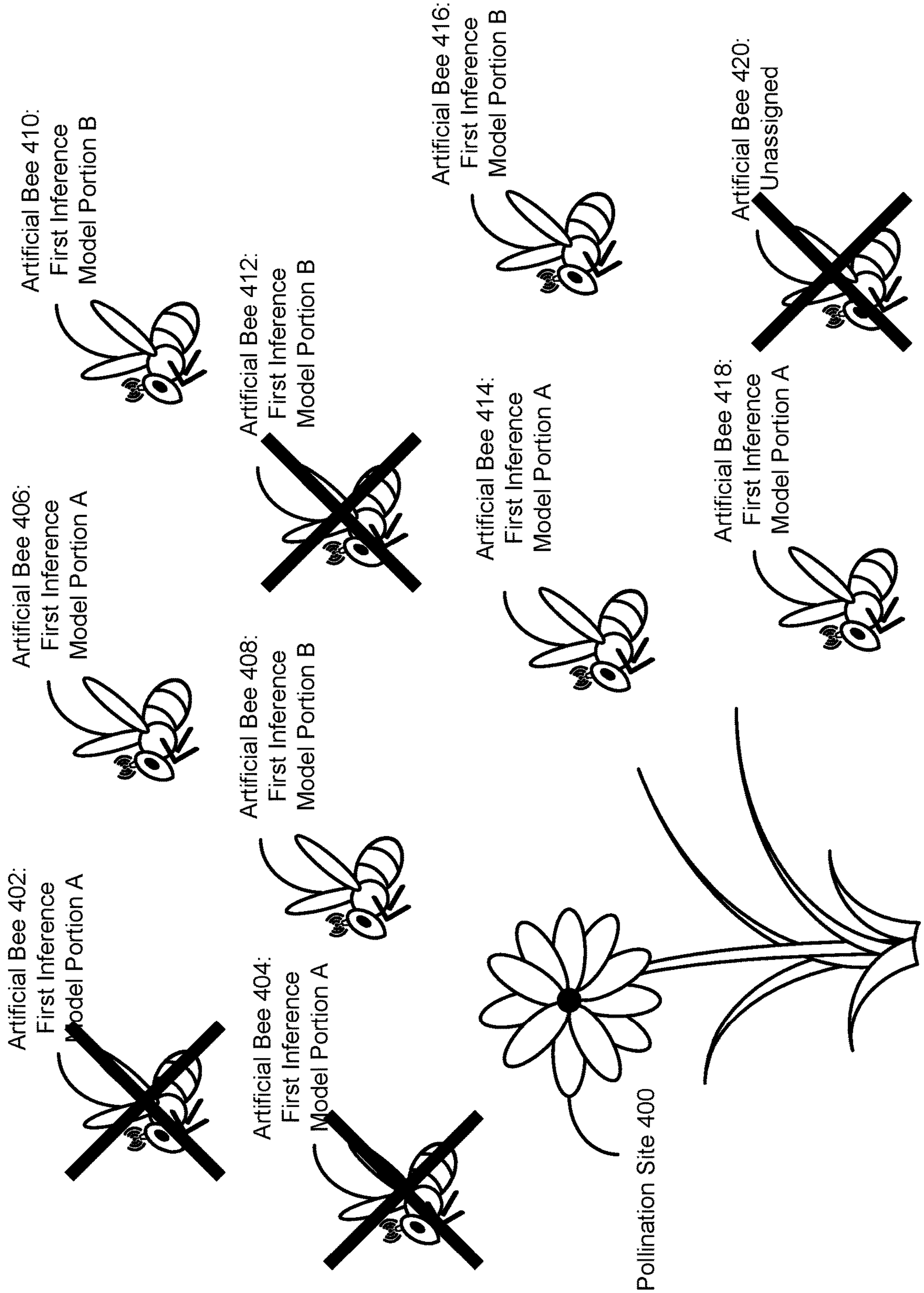

To further clarify embodiments disclosed herein, an example implementation in accordance with an embodiment is shown in FIGS. 4A-4C. These figures show diagrams illustrating an inference model execution and management process to support an environmental conservation effort in accordance with an embodiment. FIGS. 4A-4C may show examples of processes for obtaining inferences using one or more inference models across multiple data processing systems to drive the environmental conservation effort in accordance with an embodiment. While described with respect to environmental conservation efforts, it will be understood that embodiments disclosed herein are broadly applicable to different use cases as well as different types of data processing systems than those described below.

Turning to FIG. 4A, consider a scenario in which a swarm of artificial bees (e.g., data processing systems having limited computing resources) may be configured to pollinate plants along a pollination route. The swarm of artificial bees may collect data from the environment (e.g., types of plant life, density of plant life, etc.) and generate inferences to make decisions regarding which plants to pollinate, how to adjust the pollination route, and/or other decisions. To generate the inferences, two inference models may be utilized. A first inference model may generate inferences regarding which plants to pollinate and whether to adjust the pollination route. A second inference model may generate inferences regarding ambient conditions (e.g., temperature, humidity, etc.) along the pollination route. The first inference model may have a higher priority ranking than the second inference model, as the first inference model may have a higher degree of preference for future completion of inference generation to a downstream consumer than the second inference model.

The first and second inference models may be partitioned into portions and each portion may be distributed to a unique artificial bee in the swarm of artificial bees. To distribute portions of the inference models, an inference model manager (not shown) may obtain an execution plan. The execution plan may include instructions for distribution, execution, and management of the first and second inference models to facilitate timely execution of the inference models with respect to the needs of a downstream consumer (in this example, the artificial bees themselves). The instructions for distribution may include assurance levels (e.g., a quantity of copies of each portion of each inference model) to maintain redundancy and/or execution locations (e.g., geographic locations) for the artificial bees.

For example, the execution plan may require operation of at least three copies of each portion of the first inference model and at least one copy of each portion of the second inference model to provide redundancy and ensure accuracy of inferences generated by each inference model. The swarm of artificial bees may also include at least one unassigned artificial bee (an artificial bee that does not currently host a portion of an inference model).

As shown in FIG. 4A, the inference model manager may distribute three copies of the first portion (e.g., portion A) of the first inference model to three artificial bees (e.g., artificial bee 402, artificial bee 404, and artificial bee 406) and three copies of the second portion (e.g., portion B) of the first inference model to three artificial bees (e.g., artificial bee 408, artificial bee 410, and artificial bee 412). The inference model manager may also distribute one copy of a first portion (e.g., portion A) of the second inference model to artificial bee 414 and one copy of a second portion (e.g., portion B) of the second inference model to artificial bee 416. Two unassigned artificial bees (e.g., artificial bee 418 and artificial bee 420) may also be included in the swarm of artificial bees. In this example, the artificial bees 418 and 420 are shown (e.g., beyond what is required by the execution plan) to provide for dynamic management of the inference models. Additional or fewer copies of any portion of any inference model may be distributed to any number of artificial bees without departing from embodiments disclosed herein. The swarm of artificial bees may approach pollination site 400 to perform data collection, inference generation, and pollination of pollination site 400.

The execution plan may also instruct each artificial bee to transmit operational capability data to the inference model manager once per hour. By doing so, inference model manager may determine whether the swarm of artificial bees remains in compliance with the execution plan.

However, the artificial bees may encounter adverse environmental conditions (e.g., weather patterns, wildlife, etc.) that may lead to the termination of one or more artificial bees. To maintain functionality of at least the highest priority inference model of the inference models (e.g., the first inference model) in the event of the termination and/or reduced functionality of one or more artificial bees, the artificial bees may be dynamically re-assigned to meet the needs of the downstream consumer as described below.

Turning to FIG. 4B, the swarm of artificial bees may fly through some overgrown plant life while visiting pollination site 400. The artificial bees may get caught in the thorns of an overgrown bush and four of the artificial bees (e.g., artificial bees 402, 404, 412, and 420) may lose their connection with the rest of the swarm. By doing so, the portions of the inference models hosted by artificial bees 402, 404, 412, and 420 may lose functionality. In this example, artificial bee 420 may not host a copy of any portion of the inference model and, therefore, may not be required to comply with the execution plan. However, artificial bees 402 and 404 may both host copies of portion A of the first inference model and only one functional copy of portion A of the first inference model may remain. Similarly, artificial bee 412 may host a copy of portion B of the first inference model and only two functional copies of portion B of the first inference model may remain. As the execution plan specifies that three instances of portion A of the first inference model and three instances of portion B of the first inference model must be operational, the artificial bee swarm no longer complies with the needs of the downstream consumer with respect to the first inference model.

The artificial bees may transmit operational capability data to an inference model manager (not shown) and the inference model manager may perform a compliance analysis to determine whether the number of instances of each portion of each inference model matches the execution plan. In this example, the compliance analysis may indicate that the number of instances of each portion of each inference model does not match the execution plan. The inference model manager may then perform a capacity analysis to determine whether the artificial bee swarm has access to sufficient computing resources to host and operate both the first and second inference model in a manner that complies with the needs of the downstream consumer. The inference model manager may determine that the artificial bee swarm does not have sufficient computing resources to host and operate the first and second inference model.

The inference model manager may utilize a priority ranking of the first and second inference model to obtain an updated execution plan. Turning to FIG. 4C, the updated execution plan may be implemented by re-assigning artificial bees to ensure operation of the first inference model (e.g., the higher priority inference model). To do so, artificial bee 418 (previously unassigned) may be assigned to host an instance of portion A of the first inference model. Artificial bees 414 and 416 (previously hosting portions of the second inference model), may be re-assigned to ration computing resources in a manner that complies with the priority ranking and the needs of the downstream consumer. Artificial bee 414 may be re-assigned to host portion A of the first inference model and artificial bee 416 may be re-assigned to host portion B of the first inference model.

By doing so, three instances of portion A of the first inference model and three instances of portion B of the first inference model may remain in the artificial bee swarm. Therefore, the first inference model may operate with reduced downtime when compared to a system where new data processing systems (e.g., new artificial bees) are deployed to replace terminated artificial bees. While described above with respect to termination of data processing systems, available computing resources may be reduced temporarily or permanently for other reasons without departing from embodiments disclosed herein. As an example, solar-powered artificial bees may have a reduced overall computing resource capacity at night and may re-assign portions of the inference models to support operation of the first inference model overnight. During the day, the artificial bee swarm may again re-assign data processing systems to return to operation of the first and second inference models.

Thus, as illustrated in FIGS. 4A-4C, embodiments disclosed herein may provide for a distributed environment capable of providing distributed services as the membership of the distributed environment changes over time and/or unexpectedly. Consequently, embodiments disclosed herein may facilitate operation of distributed environments in challenging environments.

Figure 5:
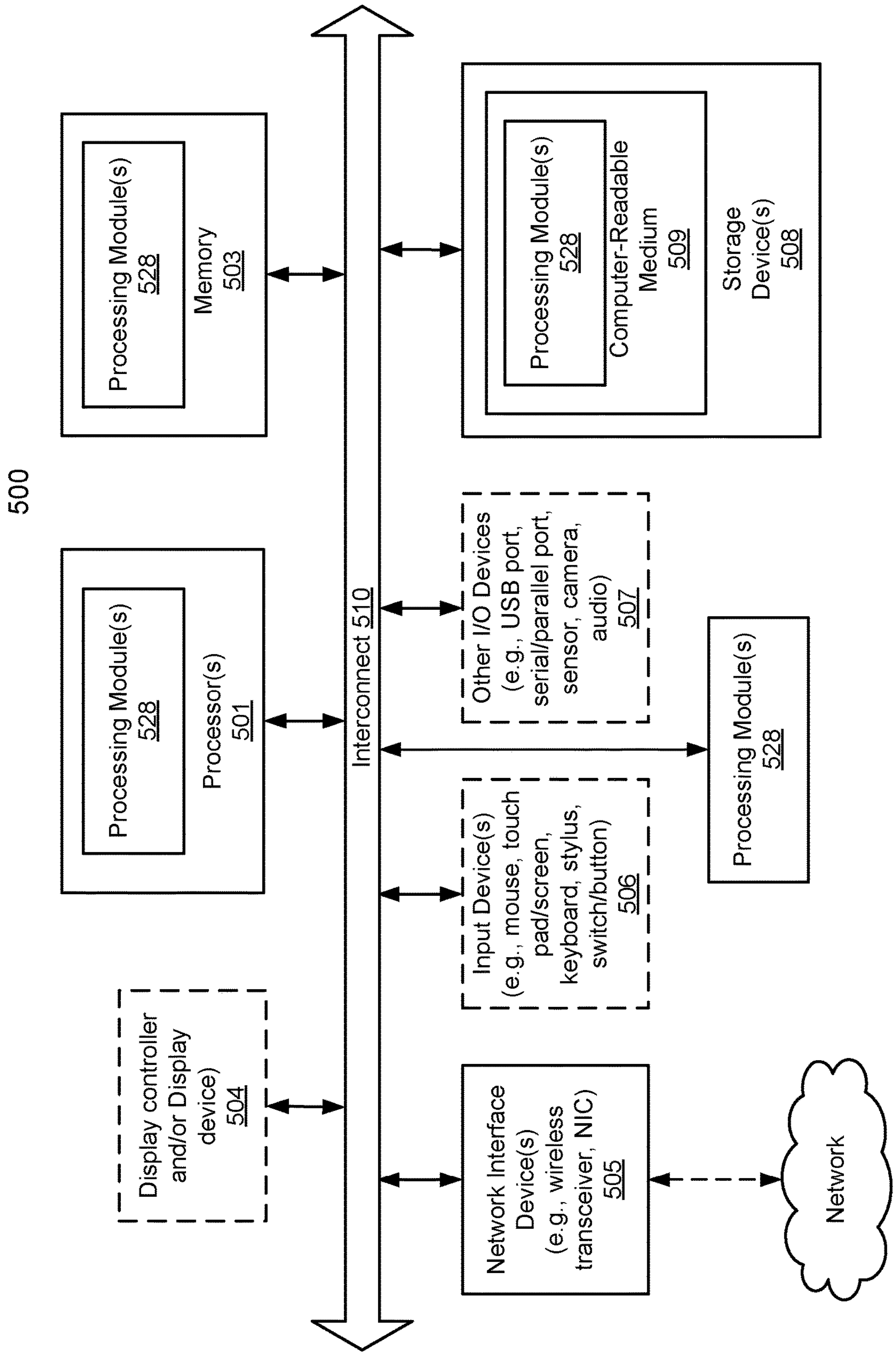
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing inference models hosted by data processing systems to complete timely execution of the inference models, the method comprising:

making a first determination, based on a result of a compliance analysis of operational capability data obtained from the data processing systems and a result of a capacity analysis of the operational capability data, regarding whether the inference models are likely to complete timely execution;

in a first instance of the first determination where the inference models are unlikely to complete timely execution:

making a second determination, based on the result of the capacity analysis, regarding whether the data processing systems have capacity to host a total quantity of inference models specified by an execution plan, the execution plan indicates a priority ranking, the priority ranking indicating a preference for future completion of inference generation by each type of inference model of the inference models, a first type of inference model having a higher priority ranking than a second type of inference model;

in a first instance of the second determination where the data processing systems have insufficient capacity to host the total quantity of inference models:

modifying the execution plan to obtain an updated execution plan, the execution plan being modified to retain a first quantity of instances for the first type of inference model of the inference models and reducing a second quantity of instances for the second type of inference model of the inference models;

identifying a number of data processing systems assigned to the second type of inference model that extend beyond the second quantity of instances that is reduced in the updated execution plan;

re-assigning the number of the data processing systems in accordance with the updated execution plan; and deploying inference model portions to the re-assigned data processing systems in accordance with the updated execution plan.

2. The method of claim 1, further comprising:

in a second instance of the second determination where the data processing systems have sufficient capacity to host the total quantity of inference models:

modifying the execution plan to obtain an updated execution plan, the execution plan being modified to reassign a host for one inference model of the inference models to a new data processing system of the data processing systems; and modifying the deployment of the inference models based on the updated execution plan.

3. The method of claim 1, further comprising:

prior to making the first determination:

collecting the operational capability data from the data processing systems based on the execution plan for the inference models and a type of each inference model of the inference models that is hosted by the data processing systems.

4. The method of claim 3, further comprising:
prior to making the first determination and after collecting the operational capability data:
performing a compliance analysis of the operational capability data to identify whether quantities of the types of each inference model of the inference models meet corresponding thresholds specified by the execution plan; and
performing a capacity analysis of the operational capability data to identify a quantity of inference models that are executable by the data processing systems.

5. The method of claim 4, wherein the execution plan indicates:
a computing resource requirement for each inference model of the inference models.

6. The method of claim 1, wherein a higher priority ranking specifies a higher degree of preference to a downstream consumer.

7. The method of claim 1, wherein the execution plan indicates:
a quantity of instances for each inference model of the inference models;
an execution location for each inference model of the inference models; and
an operational capability data transmission schedule for the data processing systems.

8. A non-transitory machine-readable medium having instructions stored therein, which when executed by a processor, cause the processor to perform operations for managing inference models hosted by data processing systems to complete timely execution of the inference models, the operations comprising:
making a first determination, based on a result of a compliance analysis of operational capability data obtained from the data processing systems and a result of a capacity analysis of the operational capability data, regarding whether the inference models are likely to complete timely execution;
in a first instance of the first determination where the inference models are unlikely to complete timely execution:
making a second determination, based on the result of the capacity analysis, regarding whether the data processing systems have capacity to host a total quantity of inference models specified by an execution plan, the execution plan indicates a priority ranking, the priority ranking indicating a preference for future completion of inference generation by each inference model of the inference models, a first type of inference model having a higher priority ranking than a second type of inference model;
in a first instance of the second determination where the data processing systems have insufficient capacity to host the total quantity of inference models:
modifying the execution plan to obtain an updated execution plan, the execution plan being modified to retain a first quantity of instances for the first type of inference model of the inference models and reducing a second quantity of instances for the second type of inference model of the inference models;
identifying a number of data processing systems assigned to the second type of inference model that extend beyond the second quantity of instances that is reduced in the updated execution plan;
re-assigning the number of the data processing systems in accordance with the updated execution plan; and
deploying inference model portions to the re-assigned data processing systems in accordance with the updated execution plan.

9. The non-transitory machine-readable medium of claim 8, wherein the operations further comprise:
in a second instance of the second determination where the data processing systems have sufficient capacity to host the total quantity of inference models:
modifying the execution plan to obtain an updated execution plan, the execution plan being modified to reassign a host for one inference model of the inference models to a new data processing system of the data processing systems; and
modifying the deployment of the inference models based on the updated execution plan.

10. The non-transitory machine-readable medium of claim 8, wherein the operations further comprise:
prior to making the first determination:
collecting the operational capability data from the data processing systems based on the execution plan for the inference models and a type of each inference model of the inference models that is hosted by the data processing systems.

11. The non-transitory machine-readable medium of claim 10, wherein the operations further comprise:
prior to making the first determination and after collecting the operational capability data:
performing a compliance analysis of the operational capability data to identify whether quantities of the types of each inference model of the inference models meet corresponding thresholds specified by the execution plan; and
performing a capacity analysis of the operational capability data to identify a quantity of inference models that are executable by the data processing systems.

12. The non-transitory machine-readable medium of claim 11, wherein the execution plan indicates:
a computing resource requirement for each inference model of the inference models.

13. The non-transitory machine-readable medium of claim 8, wherein a higher priority ranking specifies a higher degree of preference to a downstream consumer.

14. The non-transitory machine-readable medium of claim 8, wherein the execution plan indicates:
a quantity of instances for each inference model of the inference models;
an execution location for each inference model of the inference models; and
an operational capability data transmission schedule for the data processing systems.

15. A data processing system, comprising:
a processor; and
a memory coupled to the processor to store instructions, which when executed by the processor, cause the processor to perform operations for managing inference models hosted by data processing systems to complete timely execution of the inference models, the operations comprising:
making a first determination, based on a result of a compliance analysis of operational capability data obtained from the data processing systems and a result of a capacity analysis of the operational capability data, regarding whether the inference models are likely to complete timely execution;

in a first instance of the first determination where the inference models are unlikely to complete timely execution:

making a second determination, based on the result of the capacity analysis, regarding whether the data processing systems have capacity to host a total quantity of inference models specified by an execution plan, the execution plan indicates a priority ranking, the priority ranking indicating a preference for future completion of inference generation by each inference model of the inference models, a first type of inference model having a higher priority ranking than a second type of inference model;

in a first instance of the second determination where the data processing systems have insufficient capacity to host the total quantity of inference models:

modifying the execution plan to obtain an updated execution plan, the execution plan being modified to retain a first quantity of instances for the first type of inference model of the inference models and reducing a second quantity of instances for the second type of inference model of the inference models;

identifying a number of data processing systems assigned to the second type of inference model that extend beyond the second quantity of instances that is reduced in the updated execution plan;

re-assigning the number of the data processing systems in accordance with the updated execution plan; and deploying inference model portions to the re-assigned data processing systems in accordance with the updated execution plan.

16. The data processing system of claim 15, wherein the operations further comprise:

in a second instance of the second determination where the data processing systems have sufficient capacity to host the total quantity of inference models:

modifying the execution plan to obtain an updated execution plan, the execution plan being modified to reassign a host for one inference model of the inference models to a new data processing system of the data processing systems; and modifying the deployment of the inference models based on the updated execution plan.

17. The data processing system of claim 15, wherein the operations further comprise:

prior to making the first determination:

collecting the operational capability data from the data processing systems based on the execution plan for the inference models and a type of each inference model of the inference models that is hosted by the data processing systems.

18. The data processing system of claim 17, wherein the operations further comprise:

prior to making the first determination and after collecting the operational capability data:

performing a compliance analysis of the operational capability data to identify whether quantities of the types of each inference model of the inference models meet corresponding thresholds specified by the execution plan; and performing a capacity analysis of the operational capability data to identify a quantity of inference models that are executable by the data processing systems.

19. The data processing system of claim 18, wherein the execution plan indicates:

a computing resource requirement for each inference model of the inference models.

20. The data processing system of claim 15, wherein a higher priority ranking specifies a higher degree of preference to a downstream consumer.

* * * * *